United States Patent
Mann

(10) Patent No.: US 6,626,132 B1
(45) Date of Patent: Sep. 30, 2003

(54) MULTIPLE PET LEASH

(76) Inventor: Scott K. Mann, 5423 Sunstone La., Castle Rock, CO (US) 80104

( * ) Notice: Subject to any disclaimer, the term of this patent is extended or adjusted under 35 U.S.C. 154(b) by 0 days.

(21) Appl. No.: 10/178,812

(22) Filed: Jun. 24, 2002

(51) Int. Cl.[7] ............................................. A01K 27/00
(52) U.S. Cl. ...................... 119/795; 119/769; 119/792
(58) Field of Search ................................ 119/712, 769, 119/772, 779, 792, 795

(56) References Cited

U.S. PATENT DOCUMENTS

| | | | |
|---|---|---|---|
| 4,879,972 A | 11/1989 | Crowe et al. ............... | 119/792 |
| 4,892,063 A | 1/1990 | Garrigan ................... | 119/795 |
| 5,551,379 A | 9/1996 | Hart ............... | 119/771 |
| 5,632,234 A | 5/1997 | Parker ..................... | 119/795 |
| 5,701,848 A | 12/1997 | Tozawa ..................... | 119/797 |
| 5,852,988 A | 12/1998 | Gish ........................ | 119/795 |
| 5,901,668 A | 5/1999 | Goodger, Sr. ............... | 119/795 |
| D425,265 S | 5/2000 | Rubinstein ................. | D30/153 |
| 6,237,539 B1 | 5/2001 | Sporn ....................... | 119/795 |
| 6,247,428 B1 | 6/2001 | Mireles .................... | 119/795 |
| 6,273,029 B1 | 8/2001 | Gish ........................ | 119/792 |

OTHER PUBLICATIONS

"Doolittles" http://doolittles.com, Dec. 19, 2001, pp. 4–5.
"Leash Logic," www.leashlogic.com, Dec. 18, 2001, pp. 1–3.
"2 Dog Leash" www.2dogleash.com, Dec. 18, 2001, pp. 1–7.

Primary Examiner—Charles T. Jordan
Assistant Examiner—Judith A. Nelson
(74) Attorney, Agent, or Firm—Lee G. Meyer, Esq.; Meyer & Associates, LLP

(57) ABSTRACT

A multiple pet leash includes an elongated handle portion having a loop at one end and a swivel at another end, which engages at least two pet tethers. Each of the tethers includes a swiveled, snap hook members located at the distal end for attaching the tether to a dog collar. The proximate end of each tether is permanently but slidably attached to a "D" shaped portion of the swivel, which helps avoid tangling of the tethers due to pets crossing paths. The length of the handle portion is adjustable to allow the handler adjustment of the handle portion The lengths of the pet tethers are adjustable, enabling pets of different sizes to walk around, over or under each other without requiring the handler to constantly disconnect, untangle and reconnect the leashes in order to resume orderly walking.

20 Claims, 2 Drawing Sheets

MULTIPLE PET LEASH

BACKGROUND OF THE INVENTION

1. Field of the Invention

The instant invention relates to multiple animal restraints, such as leashes and the like; and more particularly, to restraints which allow unfettered control by a single handler of multiple animals without entanglement.

2. Discussion of Related Art

Pet owners or handlers having two or more pets, such as dogs, often times have a problem in walking two dogs simultaneously without the leashes on the dogs becoming tangled. For example, if one dog on the left leash decides to switch to the right side where another dog is on a leash, the leashes will most likely become tangled. Similarly, the leashes can become tangled with the person walking two dogs, for example, if one dog decides to go around the pet owner, thereby entangling the legs of the pet owner as well as the leash of the other dog. Likewise, two dogs of differing height present a problem if walked together. Unless there is means for adjusting the leashes, the dogs are at differing distances from the owner.

Thus, in today's fast paced society, there is a need for a handler or owner to be able to restrain and/or walk multiple pets simultaneously. For example, in the city, paid assistants and pet sitters walk multiple pets. Almost 58% of dog owners own more than one dog. More than ever, multiple pets travel with their owners. This requires a lightweight, easily stored restraint device.

One of the primary problems in multiple pet walking, is the variant height of each animal, as well as varying heights of the handlers. In addition, multiple animals on a single tether system, like dogs, tend to wander in each other's path causing the lines to tangle. Leashes, such as dog leashes, that use varying length of interchangeable tethers or adjustable tethers are known. Likewise, those utilizing swivel connections at the interface of the handle and the animal tether, as well as swivel connectors at the interface with the animal restraint, such as a collar, are known.

U.S. Pat. No. 6,273,029 discloses a leash apparatus providing a swivel ring upon which is attached one or more snap hooks from individual leash leads. The problem with this arrangement is that the snap hooks even with swivels tend to interlock (tangle) one with the other during use, causing tangling of the individual leash leads. This problem exacerbates when more than two snap hooks are used. U.S. Pat. No. 5,901,668 discloses a leash having a swiveling connective portion for restraint of multiple animals on the same leash The swiveling clamp is a connective portion to connect the main line, held by the animal handler, to each of the sub lines that in turn connects to the collar of each animal. The swivel portion has a trapezoidal (triangular) shaped element for connecting to the sub lines. The problem with this arrangement is that the sub line connections are constrained in attachment to a liner element which restricts the directional flexibility of the system leading to immobility of the sub leads at their interconnect causing tangling of the sub-leads.

It would therefore be advantageous to have a multiple pet restraint with adjustable handle portion as well as adjustable pet leads having a swivel portion for fixedly securing the distillate of the handle portion with the proximate end of the animal sub-leashes wherein the ring portion connected to the sub-leashes has a circular member to prevent restriction and restrain in multiple directions.

SUMMARY OF THE INVENTION

A multiple animal restraint having a flexible main line portion, which is held by the handler, at least two flexible animal tether portions, for attachment to the animals, and a swivel for connecting the line and the tethers is provided. The swivel has two connecting elements. The mainline connecting element and an animal tether-connecting element. The mainline connecting element fixedly and slidebly connects the main line to the swivel. The tether-connecting element fixedly and slidebly connects each of the tethers, which in turn connect to the collar of each animal. The tether-connecting swivel portion has a circular or rounded bottom portion upon which the tethers reside, to allow the tethers to slide along the rounded portion to allow the animals an 180° of freedom arc without entanglement, thus solving the problem with the prior art device. Specifically, the restraint can be used for walking or restraining multiple pets without entanglement.

In accordance with the broad aspect, a flexible main line, having a proximate end and a distal end, has a means for securing the restraint on the proximate end, at least two flexible animal tethers, each having a proximate end and a distal end adopted for engaging an animal restraint such as a collar at the distal end, and, a swivel, having a main line connecting element, for slidebly and fixedly securing the distal end of the flexible main line, and an animal tether-connecting element for slidably and fixedly securing the proximate end of each flexible animal tether. The animal tether-connecting element has a rounded bottom portion, which is preferably circular in shape. In accordance with one embodiment the flexible line and/or the flexible animal tethers have means for adjusting their lengths. In accordance with another embodiment the flexible animal tethers have swiveled snap hooks for engaging the animal restraining means.

According to the invention, the tether-connecting element of the swivel has a circular bottom portion, which allows the proximate ends of the flexible animal tethers to slidably, fixedly engage the rounded portion. In one embodiment the main line connecting element and/or the tether-connecting portion are "D" shaped rings. In accordance with another embodiment the connecting portion and/or receiving portion are circular rings.

DESCRIPTION OF EXEMPLARY EMBODIMENTS

Figure 1:
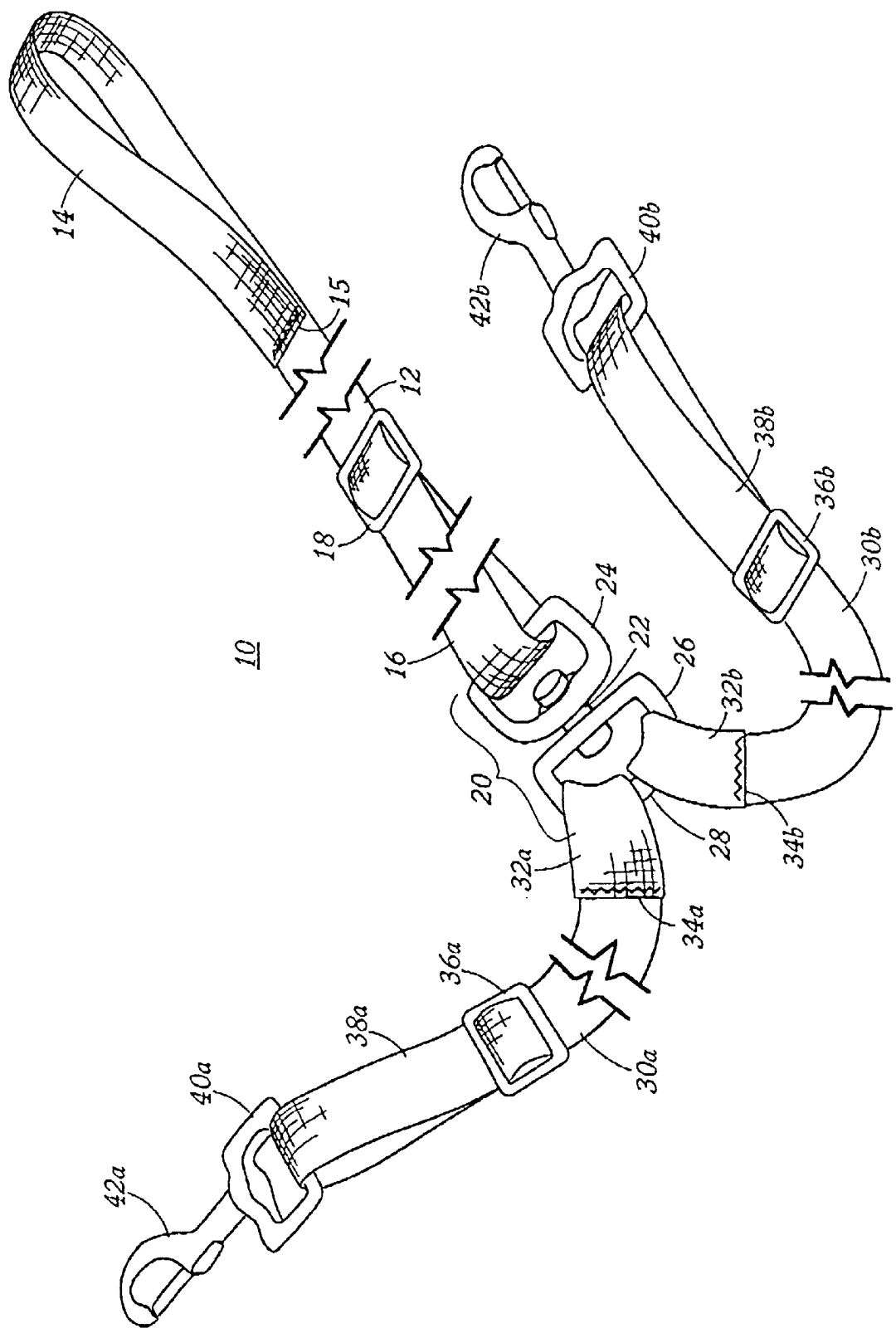
FIG. 1 shows the multiple pet restraint of the instant invention.

Referring now to the drawings, wherein like reference numerals designate identical or corresponding parts throughout the several views, FIG. 1 shows a double pet restraint 10 constructed in accordance with the present invention. A flexible main line 12, such as a nylon strap, has a loop 14 formed on the proximate end, by for example stitching 15. The distal end of flexible main line 12 has a second loop 16 thereon which is formed using adjusting slidable clamp 18. The length of flexible main line 12 can be adjusted by means of slidable clamp 18.

A swivel 20 comprises a connecting post 22, which interconnects articulating main line connecting element 24 and articulating tether-connecting element 26. Tether-connecting element 26 has a rounded bottom portion 28 upon which animal tethers 30a and 30b are fixedly and slidable attached. Animal tethers, 30a and 30b, have, at their respective distal ends, loops 32a and 32b respectively, the inner portions of which engage the rounded portion of tether-connecting element 26 as shown. The loops, 32a and 32b, are formed by stitching portion 34a and 34b, respectively. Each of the animal tethers 30a and 30b, on their respective distal ends, contain loop 38a and 38b respectively, which engage a swiveled, snap connector 42a and 42b, respectively, through connecting elements 40a and 40b, respectively. The loop 38a and 38b are formed by adjustable clamp 36a and 36b respectively.

In operation, tether-connecting element 26 can articulate 360° degrees about connecting post 22, with respect to main line connecting element 24 which in turn can articulate 360° about connecting post 22. Simultaneously, fixably attached loops 32a and 32b slidingly and fixably engage the rounded bottom portion 28 of tether-connecting element 26, such that when animals are secured to snap connectors 42a and 42b, tethers 30a and 30b slide, unobstructed, on an arc on rounded bottom portion 28.

Figure 2:
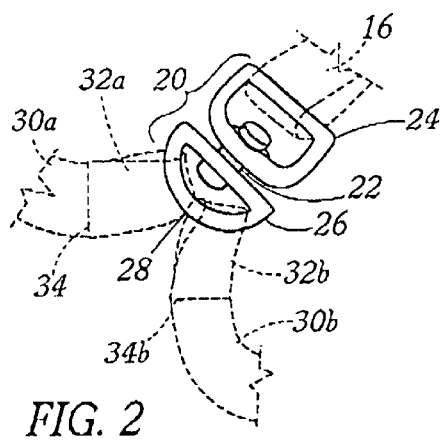
FIG. 2 shows one embodiment of the swivel in accordance with the instant invention incorporating a "D" shaped animal tether-connecting ring.

Turning to FIG. 2, there is shown a detail of the embodiment of the swivel and connecting elements as shown in FIG. 1 with the animal tethers, 30a and 30b, and main line 12, in phantom.

Figure 3:
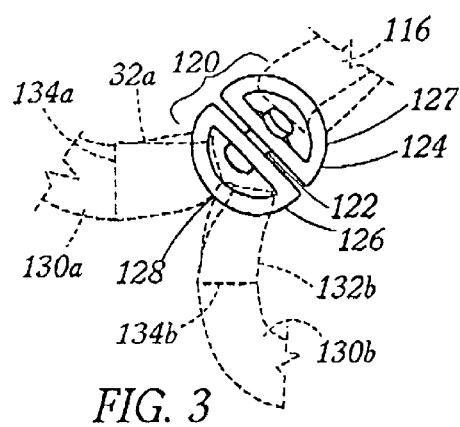
FIG. 3 shows another embodiment of the swivel in accordance with the instant invention incorporating a "D" shaped ring for both, the mainline connecting ring and the tether-connecting ring.

Turning to FIG. 3, there is shown another embodiment of the instant invention wherein main line connecting element 124 of swivel 120 is a D-shaped ring having a circular bottom portion 127 and animal tether-connecting element 126 is a D-shaped ring having a rounded bottom portion 128. Main line connecting element 124 and animal tether-connecting element 126 are inter connected to have 360° articulation about connecting post 122, as well as each other.

Figure 4:
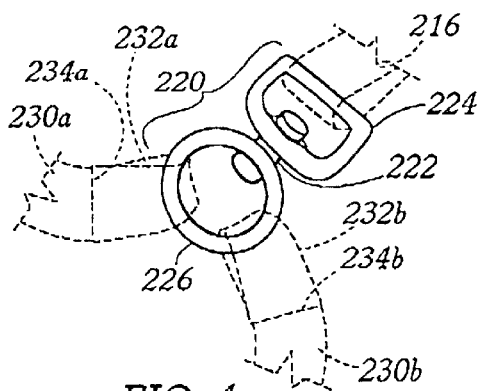
FIG. 4 shows another embodiment of the swivel in accordance with the instant invention incorporating a circular shaped tether-connecting ring.

Turning to FIG. 4, there is shown another embodiment of the instant invention having a main line connecting element 224 of swivel 220 and a circular shaped animal tether-connecting element 226. Main line connecting element 224 and animal tether-connecting element 226 are inter connected to have 360° articulation about connecting post 222, as well as each other.

Figure 5:
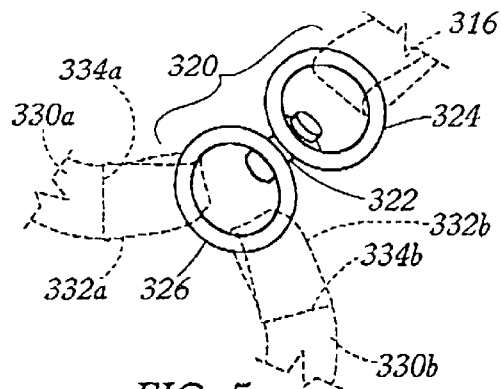
FIG. 5 shows another embodiment of the swivel in accordance with the instant invention incorporating a circular shaped mainline connecting and tether-connecting ring.

Turning to FIG. 5, there is shown another embodiment of the instant invention having a circular shaped main line connecting element 324 of swivel 320 and a circular shaped animal tether-connecting element 326. Main line connecting element 324 and animal tether-connecting element 326 are inter-connected to provide 360° articulation about connecting post 322, as well as each other.

Figure 6:
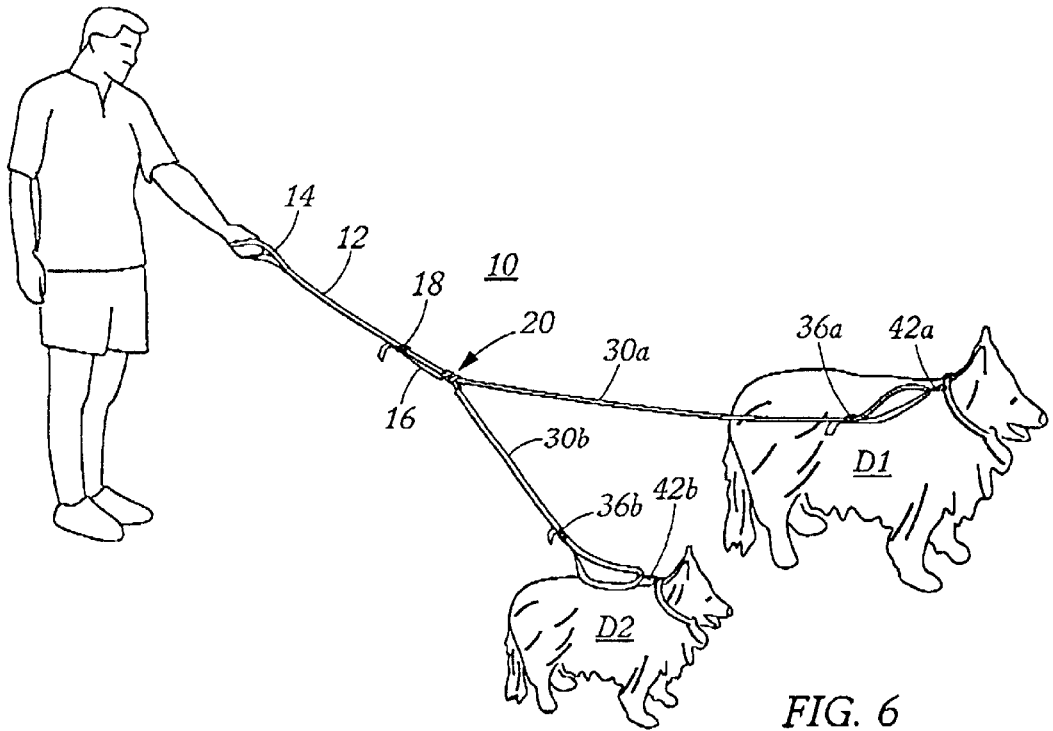
FIG. 6 shows the multiple pet restraint of FIG. 1 in use.

Turning to FIG. 6, there is shown the instant invention in operation. There is shown a double pet restraint in accordance with the invention, generally identified by reference numeral 10, which makes it possible for a single individual holding onto the loop 14 of the leash with one hand to concurrently control two dogs, dog D1 being big and strong and dog D2 being smaller and less powerful. It is important to understand that the double leash is also useable with two dogs of about the same size and strength, as well as with two dogs that more or less differ in size and strength, for the pull exerted on the handle by the two dogs is the collective pull of both dogs. Hence, the dog arrangement illustrated in FIG. 6 is only by way of example. The main component of the double leash is an elongated flexible strap of woven fabric of high strength Animal tethers 30a and 30b terminate swivel snap connectors 42a and 42b, respectively. These connectors are adapted to couple the leash sections to the existing collar or harness of the dog to be tethered by the leash.

Although the present invention has been described with reference to preferred or exemplary embodiments, including particular materials and size parameters, those skilled in the art will recognize that various modifications and variations to the same can be accomplished without departing from the spirit and scope of the present invention and that such modifications are clearly contemplated herein. No limitation with respect to the specific embodiments disclosed herein and set forth in the appended claims is intended nor should any be inferred.

What is claimed is:

1. A multiple pet restraint comprising:
   a flexible main line, having a proximate end and a distal end, wherein said proximate end has a means for restraining said mainline;
   a swivel, having a mainline connecting element and a continuous, tether-connecting element having a circular lower portion, wherein said continuous, tether-connecting element does not embody a snap-fastener and wherein said distal end of said main line is fixedly secured to said mainline connecting element; and,
   at least two flexible animal tethers, each having a proximate end which end is slidebly and fixedly secured to said circular lower portion of said continuous tether connecting element and a distal end adapted for engaging an animal restraining means.

2. The multiple pet restraint of claim 1 wherein said continuous tether-connecting element is substantially "D" shape.

3. The multiple pet restraint of claim 1 wherein said continuous tether-connecting element is substantially circular.

4. The multiple pet restraint of claim 1 wherein said main line connecting element is substantially "D" shaped.

5. The multiple pet restraint of claim 1 wherein said main line connecting element is substantially circular.

6. The multiple pet restraint of claim 1 wherein said main line has means for adjusting the length of said line.

7. The multiple pet restraint of claim 1 wherein each of said at least two animal tethers has means for adjusting the length of said tether.

8. The multiple pet restraint of claim 1 wherein each of said at least two flexible animal tethers has a swivel at each of their said distal ends.

9. The multiple pet restraint of claim 1 wherein each of said at least two animal tethers has a snap hook at each of their said distal ends for engaging an animal collar.

10. The multiple pet restraint of claim 1 wherein said main line has at its proximate end a means for selectively receiving a human hand there through.

11. A method for restraining multiple pets comprising:
   attaching each distal end of at least two flexible animal tethers, having a proximate end and a distal end, to a animal restraining means, wherein said proximate end is slidebly and fixedly secured to the bottom portion of a continuous, tether-connecting element of a swivel wherein said continuous, tether-connecting element does not embody a snap-fastener and wherein the bottom portion is substantially circular; and, a flexible line having a distal end and a proximate end wherein said distal end is fixedly attached to a mainline connecting element of said swivel and means for restraining on the proximate end.

12. The method of claim 11 wherein said continuous tether-connecting element is substantially "D" shaped.

13. The method of claim 11 wherein said continuous tether-connecting element is substantially circular.

14. The method of claim 11 wherein said mainline connecting element is substantially "D" shaped.

15. The method of claim 11 wherein said mainline connecting element is substantially circular.

16. The method of claim 11 wherein said main line has means for adjusting the length of said line.

17. The method of claim 11 wherein each of said at least two animal tethers has means for adjusting the length of said tether.

18. The method of claim 11 wherein each of said at least two animal tethers has a swivel means at each of their said distal ends.

19. The method of claims 11 wherein each of said at least two animal tethers has a snap hook each of their said distal ends for engaging in animal collar.

20. The method of claim 11 wherein said main line has at its proximate end a means for selectively receiving a human hand there through.

* * * * *